United States Patent
Baumas et al.

(10) Patent No.: US 9,062,553 B2
(45) Date of Patent: Jun. 23, 2015

(54) ANTI-WEAR DEVICE FOR THE BLADES OF A TURBINE DISTRIBUTOR IN AN AERONAUTICAL TURBINE ENGINE

(75) Inventors: Olivier Jean Daniel Baumas, Vert Saint Denis (FR); Didier Noel Durand, Pontault Combault (FR); Eric Herzer, Houilles (FR); Patrick Jacques Rossi, Vincennes (FR)

(73) Assignee: SNECMA, Paris (FR)

(*) Notice: Subject to any disclaimer, the term of this patent is extended or adjusted under 35 U.S.C. 154(b) by 1058 days.

(21) Appl. No.: 13/131,036

(22) PCT Filed: Nov. 25, 2009

(86) PCT No.: PCT/EP2009/065860
§ 371 (c)(1),
(2), (4) Date: Jul. 22, 2011

(87) PCT Pub. No.: WO2010/060938
PCT Pub. Date: Jun. 3, 2010

(65) Prior Publication Data
US 2012/0128481 A1    May 24, 2012

(30) Foreign Application Priority Data
Nov. 26, 2008    (FR) ...................... 08 58028

(51) Int. Cl.
*F01D 5/30*    (2006.01)
*F01D 9/02*    (2006.01)
*F01D 9/04*    (2006.01)

(52) U.S. Cl.
CPC .............. *F01D 9/042* (2013.01); *F01D 5/3092* (2013.01); *Y02T 50/67* (2013.01); *F05D 2300/509* (2013.01)

(58) Field of Classification Search
CPC ........... F01D 5/30; F01D 5/3092; F01D 5/16; F01D 5/3007; F01D 5/3023; F01D 5/303; F01D 5/3038; F01D 9/00; F01D 9/02
USPC ........ 415/185–191, 196, 209.2, 209.3, 209.4; 416/218, 219 R, 224
See application file for complete search history.

(56) References Cited

U.S. PATENT DOCUMENTS 4,078,922 A * 3/1978 Magyar et al. ................. 420/437
5,192,185 A * 3/1993 Leonard ..................... 415/170.1
(Continued)

FOREIGN PATENT DOCUMENTS

| EP | 0 974 734 | 1/2000 |
|----|-----------|--------|
| EP | 1 657 405 | 5/2006 |

OTHER PUBLICATIONS

International Search Report issued Feb. 2, 2010 in PCT/EP09/65860 filed Nov. 25, 2009.

*Primary Examiner* — Dwayne J White
*Assistant Examiner* — Joshua R Beebe
(74) *Attorney, Agent, or Firm* — Oblon, McClelland, Maier & Neustadt, L.L.P.

(57) ABSTRACT

A blade sector of a turbine distributor to be carried by a turbine casing of an aeronautical turbine engine, including a front connection mechanism and a rear connection mechanism, wherein the front connection mechanism is adapted so as to bear against a holder carried by the turbine casing. The sector further includes an anti-wear device formed by a piece of a metal material surrounding the front end of the front connection mechanism and provided between the front connection mechanism and the holder to ensure a sliding contact between the two parts. The anti-wear device is axially maintained in position on the blade sector using an attachment mechanism engaging with the front connection mechanism.

11 Claims, 4 Drawing Sheets

(56) References Cited

U.S. PATENT DOCUMENTS

| | | | |
|---|---|---|---|
| 5,232,340 A * | 8/1993 | Morgan | 415/190 |
| 5,240,375 A * | 8/1993 | Wayte | 416/219 R |
| 5,333,995 A * | 8/1994 | Jacobs et al. | 415/209.2 |
| 5,601,933 A * | 2/1997 | Hajmrle et al. | 428/660 |
| 5,652,044 A * | 7/1997 | Rickerby | 428/216 |
| 5,738,490 A * | 4/1998 | Pizzi | 415/139 |
| 6,179,557 B1 * | 1/2001 | Dodd et al. | 415/115 |
| 6,398,499 B1 * | 6/2002 | Simonetti et al. | 416/193 A |
| 6,431,820 B1 * | 8/2002 | Beacock et al. | 415/1 |
| 6,431,835 B1 * | 8/2002 | Kolodziej et al. | 416/219 R |
| 6,537,022 B1 * | 3/2003 | Housley et al. | 415/189 |
| 7,094,026 B2 * | 8/2006 | Coign et al. | 415/189 |
| 7,172,388 B2 * | 2/2007 | Synnott | 415/135 |
| 7,278,821 B1 * | 10/2007 | O'Reilly et al. | 415/189 |
| 2004/0151590 A1 * | 8/2004 | Forrester et al. | 416/219 R |
| 2004/0261265 A1 * | 12/2004 | Hagle et al. | 29/889.2 |
| 2006/0245924 A1 * | 11/2006 | Audeon et al. | 415/214.1 |
| 2007/0154305 A1 * | 7/2007 | Arness et al. | 415/209.2 |

* cited by examiner

ANTI-WEAR DEVICE FOR THE BLADES OF A TURBINE DISTRIBUTOR IN AN AERONAUTICAL TURBINE ENGINE

The field of the present invention is that of aeronautical engines, and more particularly that of turbo-engines.

Aeronautical turbo-engines conventionally comprise a plurality of modules, such as a low-pressure (LP) compressor followed by a high-pressure (HP) compressor, a combustion chamber, a high-pressure turbine followed by a low-pressure turbine, which drive the corresponding LP or HP compressor, and a system for discharge of the gases. Each of the turbines is formed either by fixed-blade wheels or by distributors, and mobile-blade wheels which together form a turbine stage. The LP turbine modules can comprise a plurality of stages, of which there are most often two.

The mobile blades are supported in their lower part by the rotor of the turbo-engine, and are secured to a turbine disk. On the other hand, the distributor blades are retained by their upper part, and are secured to a casing, known as a turbine casing. As can be seen in FIG. 1, which represents a configuration as claimed in the prior art, the mobile blades 2 and 4 of the two stages of a low-pressure turbine are free in their upper part, and are positioned opposite an abradable material 5 and 6 which is supported by a turbine ring. Edges which are supported by the tip of the blade engage in this abradable material in order to provide sealing between the upstream and downstream parts of the blade, despite the deformations caused by the vibrations and by the different expansions of the various materials.

In FIG. 1, the blades 1 of the distributor of the first LP stage are secured directly to the structure of the engine, whereas the blades 3 of the distributor of the second LP stage are retained by a turbine casing 7 which is connected to the structure of the engine. In radial cross-section, this casing has a hook 8 which extends axially (with reference to the axis of rotation of the turbo-engine), on which there is placed a rail 9 which forms a front (with reference to the direction of flow of the fluid) connection means, which also extends axially from the platform of the second-stage blade 3. The blade 3 is supported at its front end by the hook 8 of the LP casing which forms a support for the front rail 9, and it is supported at its rear end by a rear rail 10 which is placed on a rear hook supported by the LP turbine casing, either directly, or, as illustrated in FIG. 1, by means of the turbine ring of the second stage of the LP turbine. Finally, a fire-protection plate 11 is positioned on the front rail 9 against the platform of the distributor blade 3. Compressible thermal insulation 12 is disposed between the fire-protection plate 11 and the turbine casing 7.

However, it is found that after a certain time of use, there is wear of the hook 8 caused by the micro-displacements created by the vibrations and the thermal expansion differences between the parts. This wear can even result in complete destruction of the hook of the casing, which gives rise to loss of the retention of the blade 3, which can then pivot around the rear hook, and interfere in its lower part with the course of the mobile LP blades 4. The consequences of this wear would then be extremely serious, since they could lead to breakdown of the engine.

Anti-wear devices have been proposed, in particular in patent applications EP1657405 and EP0974734, in order to assist sliding contact between the parts. These devices are simply inserted between the turbine blades and turbine casing, without having the function of constituting a solution for repair of worn blades. In the case of blades which have been repaired, it is important to be able to make standardized use of the repaired blades amongst new blades, and thus, by reducing the constraints associated with logistics, to reduce costs.

The object of the present invention is to eliminate these disadvantages by proposing a solution which can be installed for repair of existing engines, and which facilitates the control of stocks of turbine distributor parts.

For this purpose, the subject of the invention is a turbine distributor blade segment which is designed to be supported by a turbine casing of an aeronautical turbo-engine, comprising a front connection means and a rear connection means, said front connection means being designed to rest on a support which is supported by the turbine casing, said segment additionally comprising an anti-wear device constituted by a part made of metal material which envelops the front end of the front connection means, and is interposed between said front connection means and said support, such as to provide sliding contact between these two parts, characterized in that the anti-wear device is retained axially in position on said blade segment by means of a securing means which co-operates with the front connection means.

The presence of the device makes it possible to eliminate the fretting between the hook of the turbine casing and the front rail of the LP distributor blade, and thus improves the service life of the hook, whilst facilitating the sliding of the parts which are in contact. The fact of retaining the anti-wear device by means of a securing means makes it possible to avoid handling the repaired segments differently from the new parts. This therefore improves the logistics of the turbine distributor parts.

Preferably, the front connection means is in the form of a tongue which extends axially, and the upper part of said device does not extend axially along the entire length of the front connection means.

The upper part of the device can thus be accommodated on the tongue of the connection means, without interfering with the fire-protection plate of the turbine.

As claimed in preferred characteristics, the anti-wear device:
  is retained in place on the front connection means by at least one pin which is fitted into a bore provided in the thickness of the connection means;
  extends along the entire length of the front connection means, and is prolonged at its rear end by a projection, said means having the form of a tongue which extends axially, and comprising at its rear end a groove in which said projection is engaged;
  comprises at least one tab which extends along the entire length of the front connection means, and ends in a projection at its rear end, said means having the form of a tongue which extends axially, and comprising at its rear end a groove in which said projection is engaged. Preferably, its overall thickness, measured radially, is smaller than or equal to that of said tongue increased by that of the part of said device which is situated between the front connection means and the support, such that said device does not project above the upper part of said tongue, said tongue having set-backs which make it possible to insert said tabs into them;
  extends along the entire length of the front connection means, and comprises at its rear end at least one dropped edge, said means having the form of a tongue which extends axially, and comprising at its rear end at least one cut-out which can receive said dropped edge; and
  extends along the entire length of the front connection means, and comprises on its upper surface at least one indentation, said means having the form of a tongue which extends axially, and comprising on the upper part of this tongue at least one indentation which can co-operate with the indentation in said device.

Advantageously, the anti-wear device has a length along the circumference which is substantially equal to that of said segment, and is positioned with angular offsetting relative to said segment, such as to be able to overlap an adjacent segment at least partially and to provide sealing between the two segments.

As claimed in other preferred characteristics, the device:
is made of a superalloy based on nickel or cobalt.
Preferably the metal material is an alloy which is sold under the commercial name HA188; and
the thickness of the material is between 0.05 and 0.4 mm.

The invention also claims a turbine module comprising at least one distributor-blade wheel constituted by segments as previously described. Finally, it claims an aeronautical engine comprising a turbine module of this type.

The invention will be better understood, and other objectives, details, characteristics and advantages thereof will become more apparent from the following detailed explanatory description of several embodiments of the invention which are provided by way of purely illustrative and non-limiting example, with reference to the attached schematic drawings.

Figure 1:
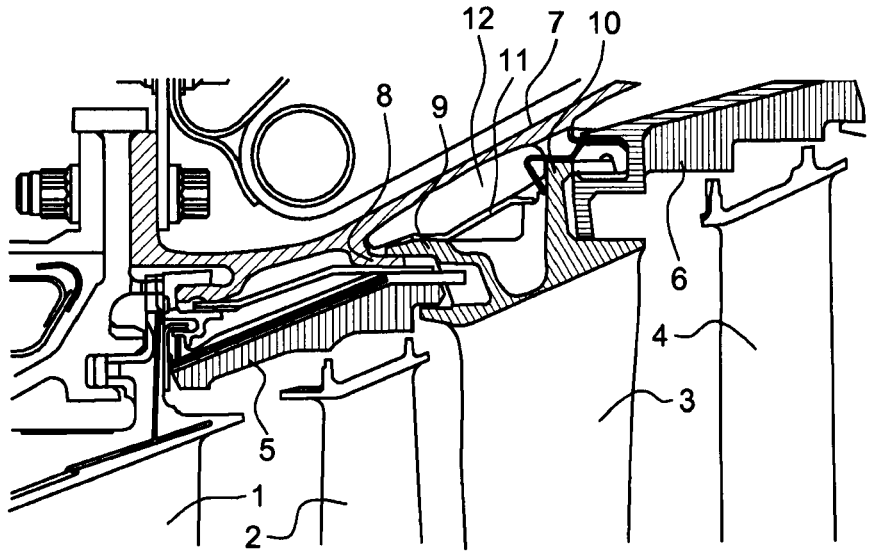
FIG. 1 is a view in radial cross-section of a system for attachment of the distributor blades of the second stage of an LP turbine as claimed in the prior art.
Figure 2:
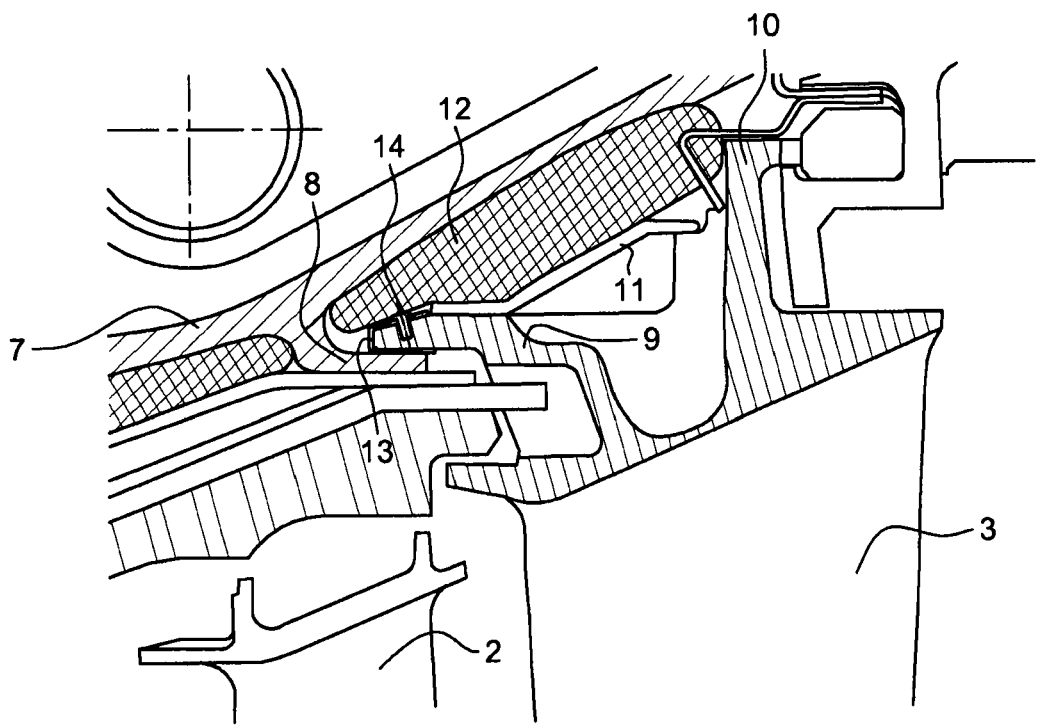
FIG. 2 is a view in radial cross-section of the system for attachment of a distributor blade of an LP turbine second stage, the platform of said blade being equipped with an anti-wear device as claimed in an embodiment of the invention.
Figure 3:
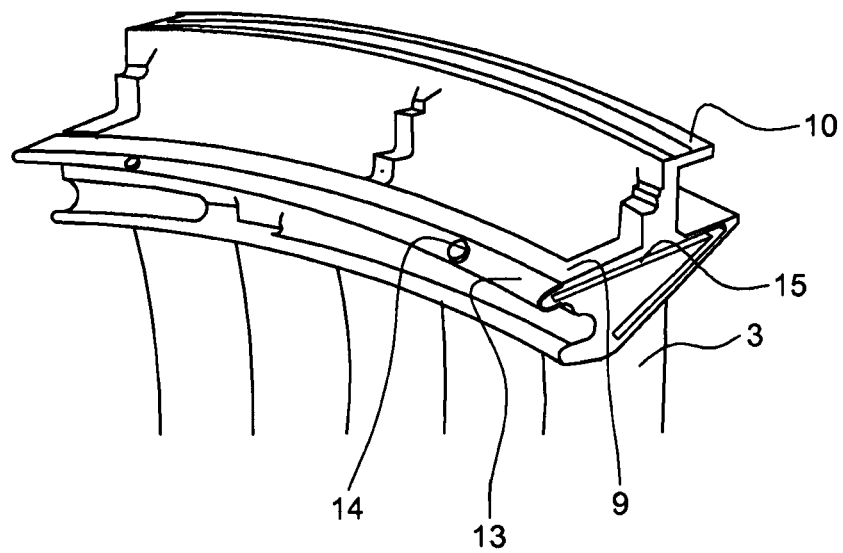
FIG. 3 is a view in perspective of a segment of a distributor of an LP turbine second stage comprising a plurality of blades, and equipped with an anti-wear device as claimed in the same embodiment of the invention.
Figure 4:
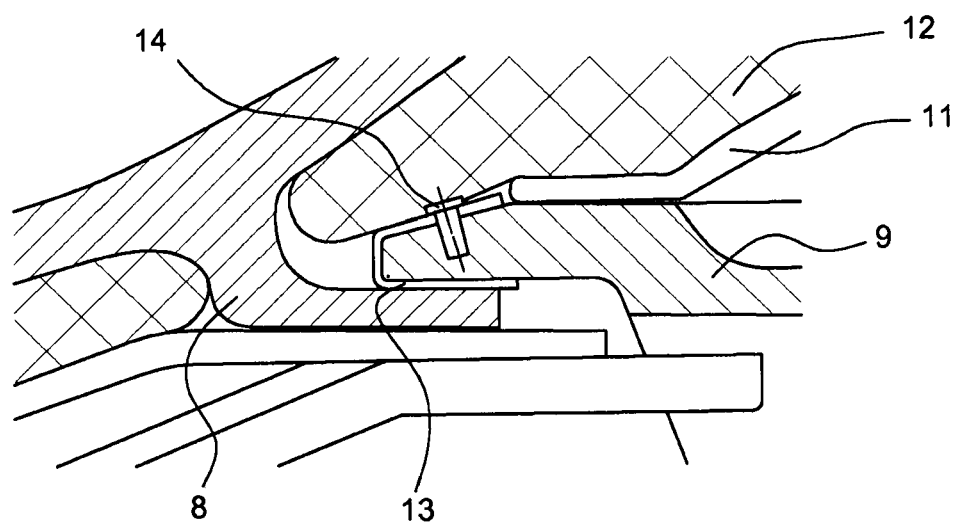
FIG. 4 is a detail view in cross-section of the attachment system shown in FIG. 2.

FIGS. 2 to 4 show the platform of a distributor blade 3 of an LP turbine second stage with a front rail 9 and a rear rail 10. The front rail 9 rests on the hook 8 of the LP turbine casing 7. In turn it supports the fire-protection plate 11, the purpose of which is to constitute a thermal barrier between the flow and the LP casing 7. In cross-section the front rail 9 has the form of a tongue which extends radially and ends in a multi-facetted or rounded end, to which there is secured an anti-wear device 13 which is the subject of the invention, and which covers the tongue and matches its form. As can be seen in FIG. 3, this device has the form of a segment, the angular opening of which corresponds to that of the segment of the LP distributor onto which it is fitted. Its radial cross-section has a form in the shape of a "U", which can envelop the end of the tongue of the front rail 9, and it is prolonged in its lower part until it extends axially from the rear end of the hook 8. It thus provides the mechanical interface between the front rail 9 and the hook 8, and eliminates any direct contact between them.

In the first embodiment, the device is secured to the front rail 9 by means of pins 14 which are fitted into bores provided in the thickness of the rail. The pins 14 are disposed regularly along the blade segment, and there is a sufficient number of them to guarantee the retention of the anti-wear device on the front rail, with FIG. 3 showing two pins by way of example, and without this number being limiting.

FIG. 3 shows a groove 15 which is hollowed in the circumferential end of the LP distributor segment. In co-operation with another groove which is positioned opposite in the adjacent segment, and with a connection strip, the purpose of this groove is to provide the sealing between two consecutive segments of the distributor. This groove does not extend axially until it extends beyond the end of the tongue of the front rail 9, which allows the anti-wear device to be positioned angularly offset relative to the segment onto which it is fitted. By being positioned so that it straddles two consecutive blade segments, the anti-wear device has the additional advantage of improving the sealing between the segments.

With reference to FIG. 4, it can be seen that the fire-protection plate 11 does not extend axially as far as the front end of the tongue of the front rail 9, and that it leaves space along this tongue for the upper part of the anti-wear device 13 to be able to be accommodated there. In this embodiment there is no overlapping of the anti-wear device 13 by the fire-protection plate 11 and vice versa.

Figure 5:
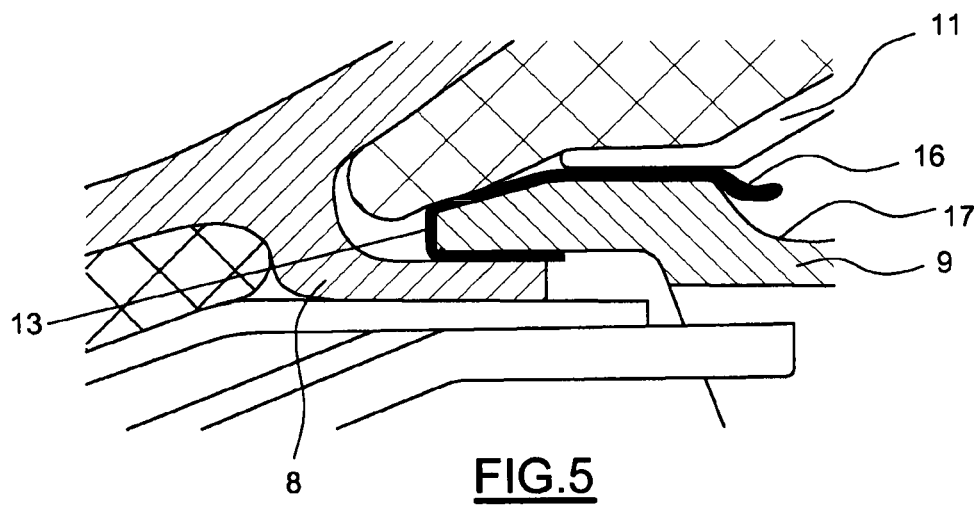
FIG. 5 is a view in cross-section showing an anti-wear device as claimed in a second embodiment.

A second embodiment will now be described with reference to FIG. 5. The elements of the device which are identical to the first embodiment are designated by the same reference numeral, and are not described again. In this case, the upper part of the anti-wear device 13 does not only cover the end of the tongue of the front rail, but covers it entirely on its outer part. The upper part ends on the rear side in a projection 16 which is engaged in a groove 17 provided in the rear end of the tongue of the front rail 9. Since the thickness of the anti-wear device 13 is small in comparison with its length, it has flexibility in the axial direction which generates a spring force, and retains it against the tongue of the front rail when the projection 16 is in place in the groove 17. The anti-wear device is put into place by thrusting it axially against the front rail 9 and by countering this spring effect until the projection 16 is accommodated in the groove 17.

Figure 6:
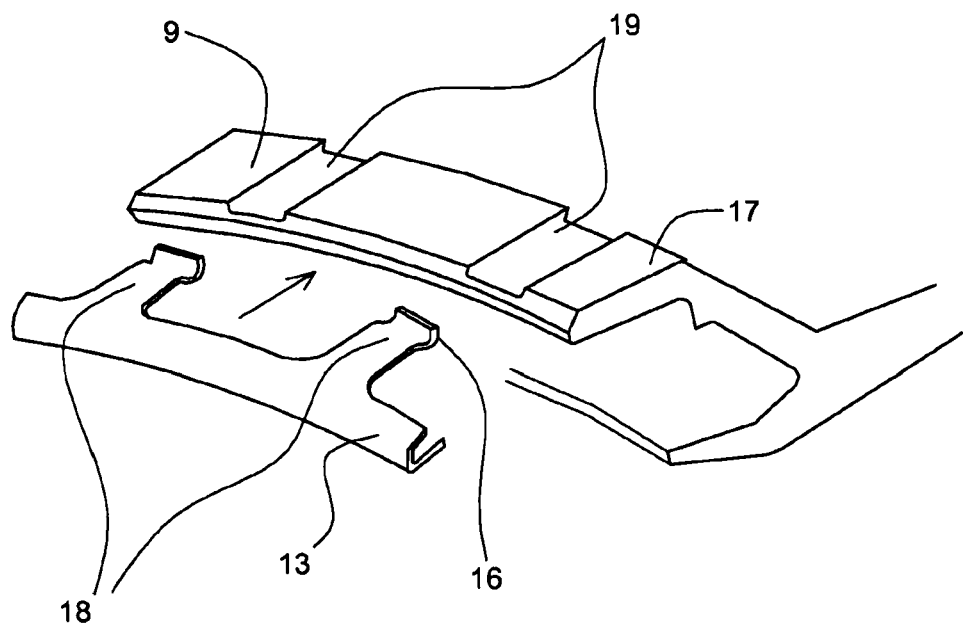
FIG. 6 is a view in cross-section showing an anti-wear device as claimed in a third embodiment.

With reference now to FIG. 6, this shows a third embodiment, which also relates to the method for securing the anti-wear device 13 onto the tongue of the front rail 9. As in the first embodiment, the axial length of the anti-wear device 13 is limited to covering the end of the front rail 9. On the other hand, this device has a plurality of tabs 18 which are distributed regularly on its circumference, of which two are shown in FIG. 6, without this number being limiting. These tabs extend axially, as in the second embodiment, until they cover the entire length of the tongue of the front rail 9, and also end in projections 16 which engage in the groove 17 in the front rail 9. In order to facilitate the passage of these tabs 18, set-backs 19 are provided in the thickness of the tongue of the front rail 9 opposite said tabs 18, which no longer project from the tongue, and do not disturb the contact between the fire-protection plate 11 and the outer part of the front rail 9. As in the previous case, the tabs 18 have flexibility in the axial direction which generates the aforementioned spring effect.

Figure 7:
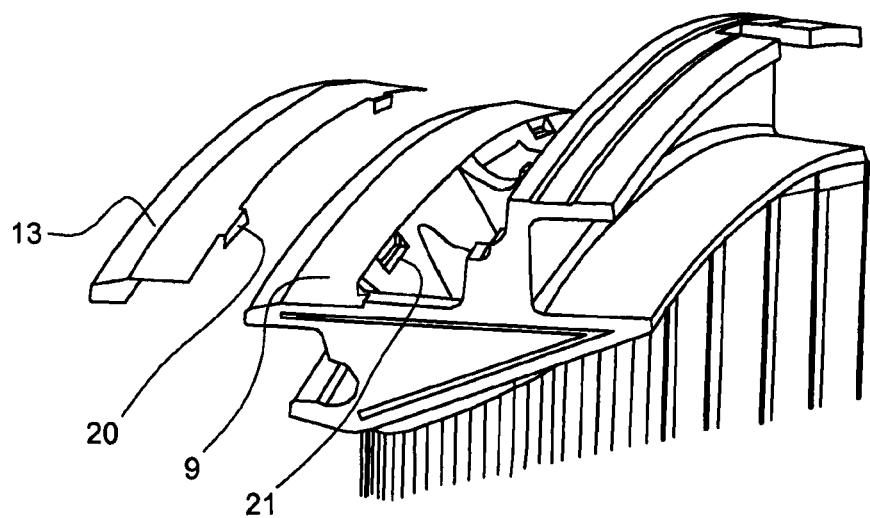
FIG. 7 is a view in cross-section showing an anti-wear device as claimed in a fourth embodiment.
Figure 8:
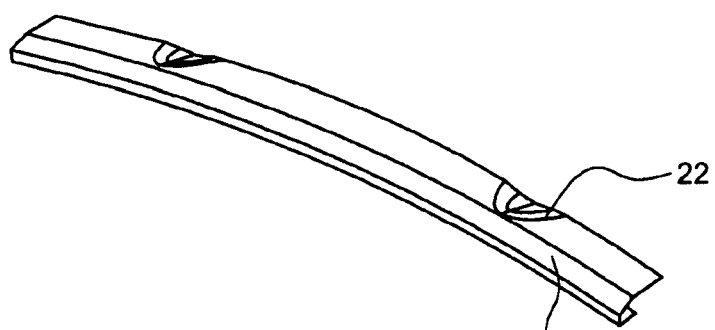
FIG. 8 is a view in cross-section showing an anti-wear device as claimed in a fifth embodiment.

Variants of the preceding embodiments are also represented in FIGS. 7 and 8. The embodiment which is represented in FIG. 7 is a variant of the second embodiment where the projection 16 is replaced by dropped edges 20 which are disposed discretely on the rear periphery of the anti-wear device 13, and where cut-outs 21 are hollowed in the groove 17 in the front rail, in order to receive said dropped edges. The embodiment which is represented in FIG. 8 is also a variant of the second embodiment, in which indentations 22 are formed in the upper part of the anti-wear device 13, for insertion in indentations which are hollowed opposite in the thickness of the front rail 9.

The improvement provided by any of the embodiments of the anti-wear device 13 will now be described.

In a common configuration of aeronautical engines, the contact between the LP turbine casing and the front point of attachment of the distributor blade of the LP turbine second stage is a sensitive point, since it is situated in a relatively hot area, and it is desirable to retain these blades by means of devices which are as light as possible. The rear attachments are less sensitive, since the surface which is available in order to provide the retention of the blades is larger.

By interposing an anti-wear device such as a foil as previously described, the service life of the parts which are in contact is improved very substantially by facilitating the sliding of one part on the other. This makes it possible to eliminate the fretting between the hook 8 of the LP turbine casing 7 and the front rail 9 of the LP distributor blade 3. The foil is preferably selected from a metal material such as a superalloy based on nickel or cobalt, for example HA188 (or KCN22W), which has the effect of creating a sliding surface between the parts, and making them withstand, without damage, the micro-displacements which are derived from the vibrations and differences of expansion.

The foil is preferably selected to be 0.08 mm thick, with a tolerance on this thickness of 8 μm, which makes it possible to guarantee assembly in tolerance conditions which are identical to the version without a foil. It will be appreciated that this thickness is purely indicative, and that it is possible to use foils with thicknesses which are close to this, for example between 0.05 and 0.4 mm.

The interposition of a foil between the hook 8 and the front rail 9 also has the effect of creating a thermal barrier between the two parts, which function at cruising speed at nominal temperatures of 637° C. for the rail and 765° C. for the hook, and at take-off of 773° C. for the rail, and 906° C. for the hook. The introduction of the foil has the effect of cutting off the thermal conduction between the rail and the hook; the resulting decrease in the temperature of the rail improves both its resistance to fretting and its mechanical strength.

Finally, the technique which consists in introducing a foil has the advantage of not modifying the parts, or modifying them only very slightly, and of being able to install the foil as a retrofit on the existing parts, whether these are new or repaired. The fact of providing retention by a securing means makes it possible to mix repaired parts with new parts, and to make them interchangeable with one another.

Fitting of the foil and rendering it integral on the front rail 9 of the distributor blades 3 before the assembly of the parts which constitute the turbine module, also makes it possible to eliminate any assembly error. Finally, the securing system selected allows this foil to be removed.

The invention, which has been described with reference to the distributor blades of the second stage of an LP turbine, can be applied, mutatis mutandis, to other fixed blades, whether they are those of another LP turbine stage or of an HP turbine stage.

Although the invention has been described in relation to several particular embodiments, it will be appreciated that it is in no way limited to these, and that it comprises all the technical equivalents of the means described, as well as their combinations, provided that these come within the scope of the invention.

The invention claimed is:

1. A turbine distributor blade segment configured to be supported by a turbine casing of an aeronautical turbo-engine, comprising:
    a front connection structure of the turbine distributor blade segment and a rear connection structure of the turbine distributor blade segment, the front connection structure configured to rest on a support which is supported by the turbine casing; and
    an anti-wear device including a part made of metal material that envelops a front end of the front connection structure, and is interposed between the front connection structure and the support, to provide sliding contact between the front connection structure and the support,
    wherein the anti-wear device is retained axially in position on the blade segment by a securing structure that cooperates with the front connection structure, and
    wherein the anti-wear device extends along an entire length of the front connection structure, and includes at a rear end of the anti-wear device at least one dropped edge, the front connection structure including a form of a tongue which extends axially, and including at a rear end of the front connection structure at least one cut-out which can receive the dropped edge.

2. The blade segment as claimed in claim 1, in which the anti-wear device has a length along a circumference that is substantially equal to that of the segment, and is positioned with angular offsetting relative to the segment, to overlap an adjacent segment at least partially and to provide sealing between the two segments.

3. The blade segment as claimed in claim 1, wherein the anti-wear device is made of a superalloy based on nickel or cobalt.

4. The blade segment as claimed in claim 3, wherein the metal material is an alloy which is sold under name HA188.

5. The blade segment as claimed in claim 1, wherein a thickness of the material of the anti-wear device is between 0.05 and 0.4 mm.

6. A turbine module of an aeronautical turbo-engine comprising at least one distributor-blade wheel including segments as claimed in claim 1.

7. An aeronautical engine comprising at least one turbine module as claimed in claim 6.

8. The blade segment as claimed in claim 1, wherein at least a portion of the anti-wear device is sandwiched between the front connection structure and a thermal insulation.

9. The blade segment as claimed in claim 1, wherein at least a portion of the front connection structure or of the anti-wear device supports a fire-protection plate.

10. The blade segment as claimed in claim 1, wherein the anti-wear device straddles a plurality of turbine distributor blade segments.

11. A turbine distributor blade segment configured to be supported by a turbine casing of an aeronautical turbo-engine, comprising:
    a front connection structure and a rear connection structure, the front connection structure configured to rest on a support which is supported by the turbine casing;
    an anti-wear device including a part made of metal material that envelops a front end of the front connection structure, and is interposed between the front connection structure and the support, to provide sliding contact between the front connection structure and the support,
    wherein the anti-wear device is retained axially in position on the blade segment by a securing structure that cooperates with the front connection structure, wherein the anti-wear device comprises at least one tab that extends along an entire length of the front connection structure, and ends in a projection at its rear end, the front connection structure having a form of a tongue that extends axially, and comprising at its rear end a groove in which the projection is engaged, and wherein an overall thickness of the anti-wear device, measured radially, is smaller than or equal to that of the tongue increased by that of the part of the device which is situated between the front connection structure and the support, such that the device does not project above the upper part of the tongue, the tongue having set-backs that make it possible to insert the at least one tab into them.

* * * * *